Nov. 8, 1966   N. ROSENSTEIN   3,283,387
APPARATUS AND METHOD FOR CRIMPING FILAMENTARY TEXTILE MATERIAL
Filed Oct. 30, 1964   7 Sheets-Sheet 3
FIG-3-
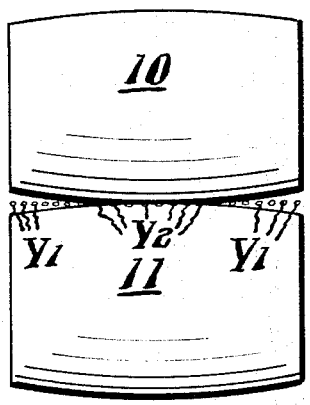
FIG-4-
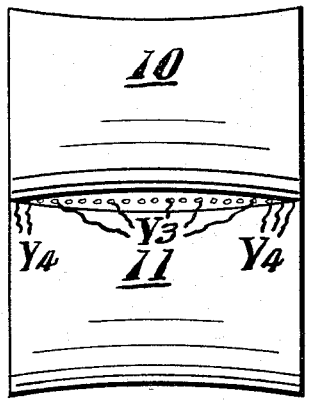
FIG-5-
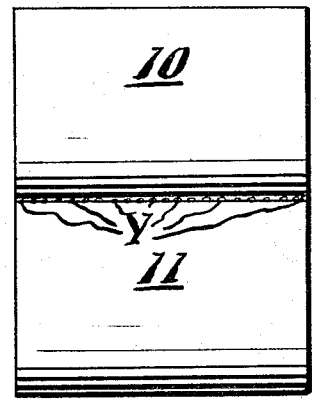
FIG-6-
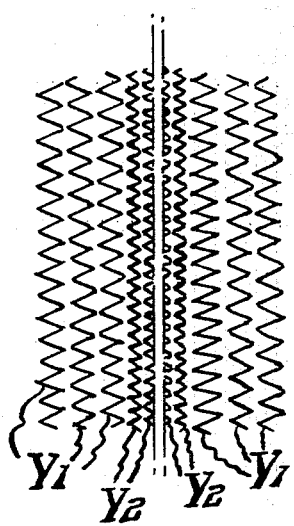
FIG-7-
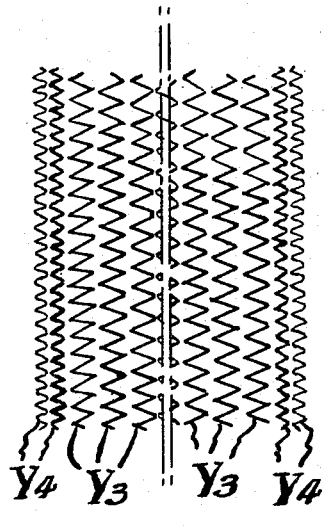
FIG-8-
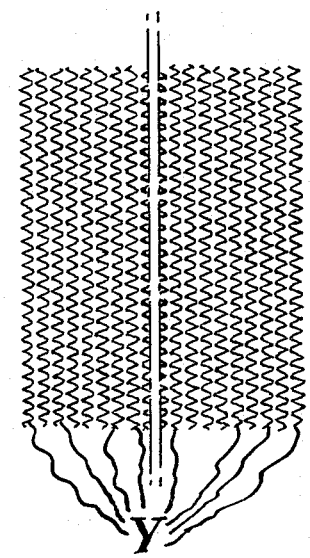
INVENTOR.
Nathan Rosenstein,
BY
Paul & Paul
ATTORNEYS.

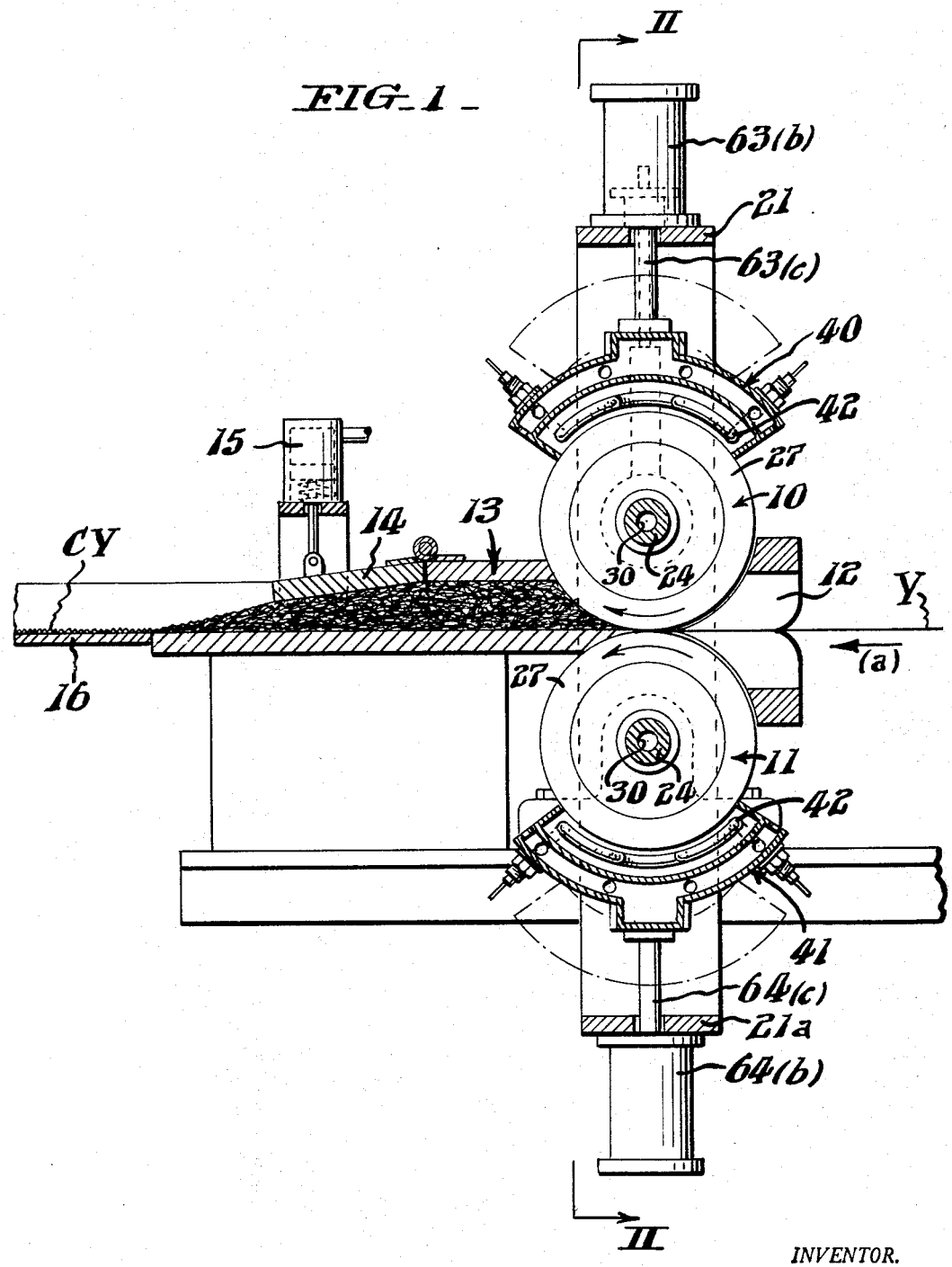

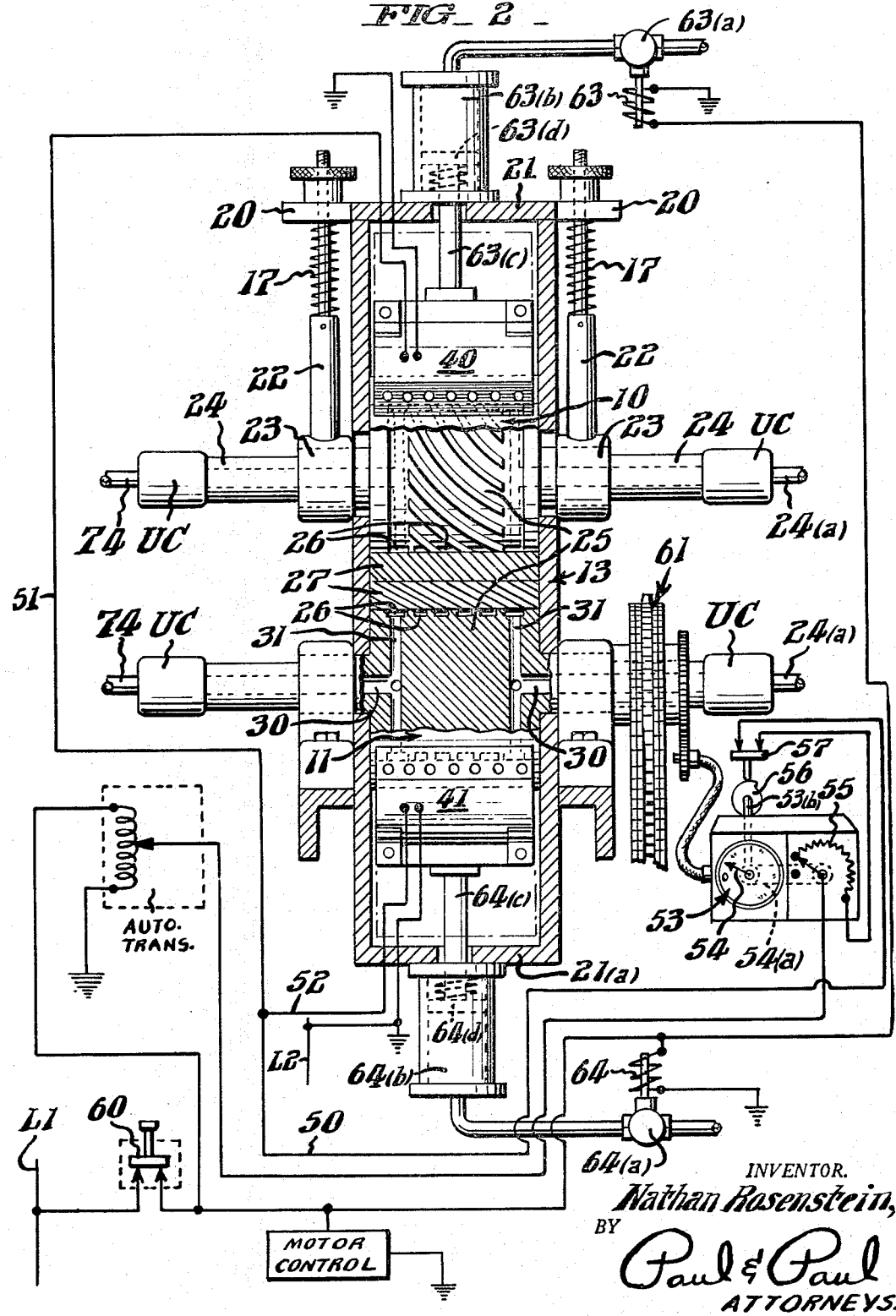

FIG_11_
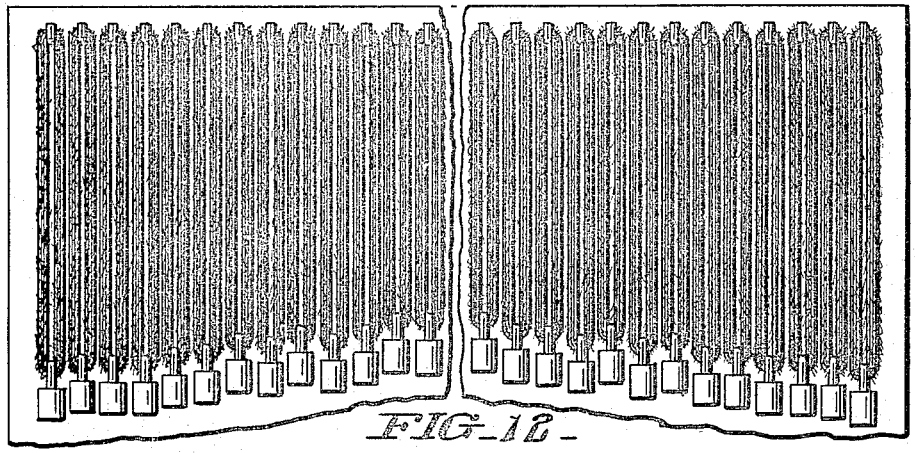
FIG_12_
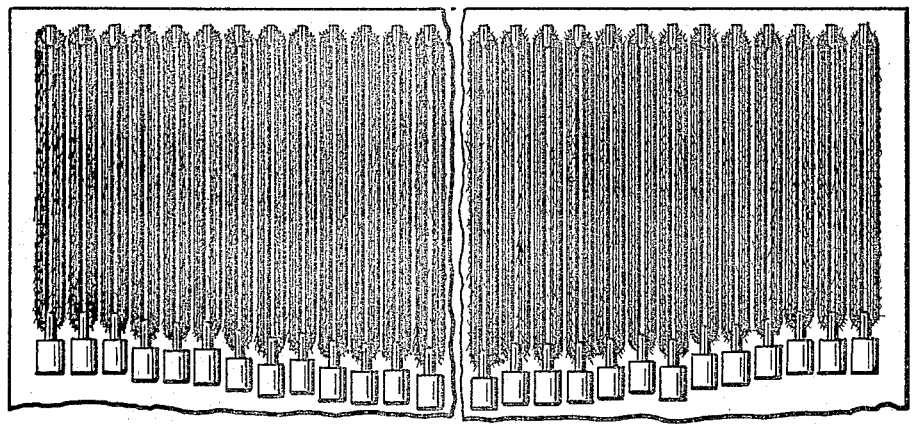
FIG_13_
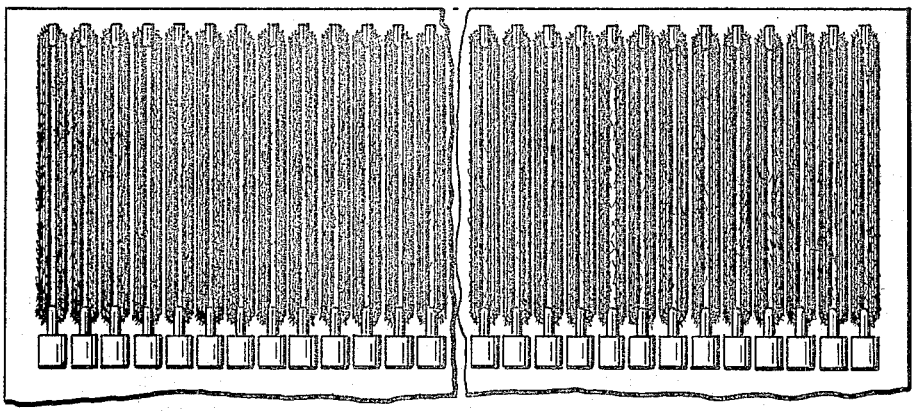
INVENTOR.
Nathan Rosenstein,
BY
Paul & Paul
ATTORNEYS.

FIG. 14

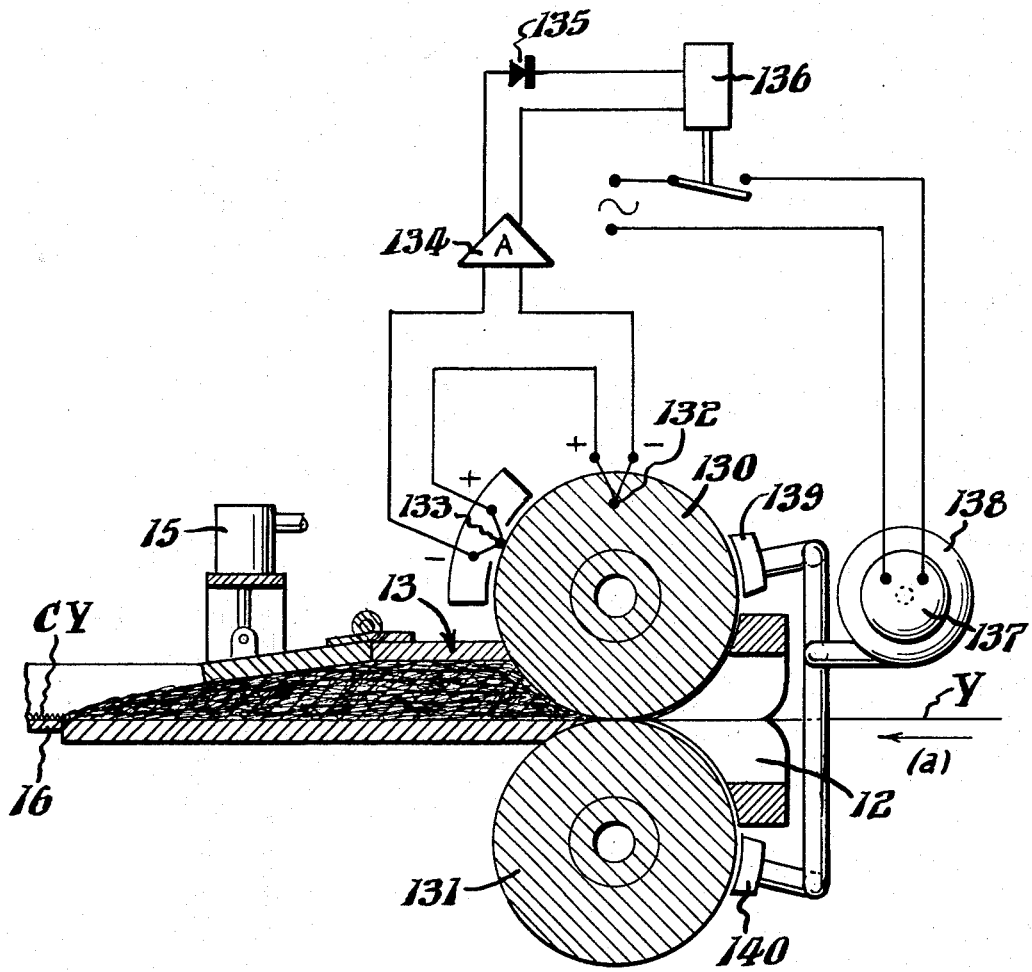

United States Patent Office 3,283,387
Patented Nov. 8, 1966

3,283,387
APPARATUS AND METHOD FOR CRIMPING FILAMENTARY TEXTILE MATERIAL
Nathan Rosenstein, West Hartford, Conn., assignor to Spunize Company of America, Inc., a corporation of Connecticut
Filed Oct. 30, 1964, Ser. No. 407,841
16 Claims. (Cl. 28—1)

This invention relates to multiple-end crimpers and methods, particularly to apparatus and method for controlling the uniformity of crimp of filamentary textile material.

The term "filamentary textile material" as used herein is intended to cover synthetic or natural (proteinaceous) filaments broadly, and in forms such as yarns, tows for staple and fiber conversion and fabrics made of such yarns, for example. In one form, in which the invention has proved itself highly advantageous, the filaments were present as a plurality of substantially parallel ends of yarn. In all forms, the filaments are crimped by rollers in a common compression area.

As examples of existing crimpers for handling multiple ends of yarn in a common chamber, reference is made to the U.S. patents to Rosenstein et al. No. 2,715,309, Suggs No. 2,860,400 and Cocker No. 3,067,480. In all of the crimpers shown therein, varying degrees of crimp nonuniformity have been encountered, particularly where the crimp rolls are of hollow cylindrical construction, but sometimes even with solid crimp rolls. Actually, hollow rolls have been found by me to be particuarly advantageous, because they can be heated internally in order concurrently to crimp and heat-set the yarns.

Uniformity of crimp is vital commercially because, for one reason, different degrees of crimp respond differently to the same dye solution, thus necessarily producing color variations from one yarn end to another. Such variations show up as defective streaks in carpets or fabrics made up of such yarns, and give rise to tremendously costly waste due to failure to meet specifications. Crimp variation also causes other non-uniformities, variations and defects in finished products which are made up of many ends of yarn.

It is difficult to detect non-uniformity of rolls, particularly because serious crimp variations can be caused by exceedingly small concave or convex roll distortions. For example, a warping of about 3 millionths of an inch for a 7-inch diameter roll with 6-inch length is sufficient to cause serious crimp variations. Moreover, the crimp rolls can be essentially perfect when no filaments are being run through, but become defective when the operation is begun. For example, visual inspection, by aiming a light from one side to the nip, and sighting from the opposite side, may well show no light-crack, indicating full tangency from roll end to roll end. But then, when the cold filaments (particularly yarns or tows) are run through, a thermal effect is created and has been found to deform one or both rolls enough to produce a defective crimped filamentary product, but this condition is then difficult to detect by sighting because the presence of the filaments interferes with sighting and the filaments are already separating the rolls, further interfering with the test. Cold filament feed is not the only causative factor; this effect may even be observed if the filaments are preheated as they are conducted toward the nip.

It has been discovered, after running non-uniform yarns and testing and proving them non-uniform, that if the crimper is shut down and the yarns are removed from between the rolls, the rolls do show a non-tangency or non-linearity when subjected to light-beam inspection. This non-tangency can occur in either direction, concave or convex.

Accordingly, it is an object of this invention to overcome the foregoing disadvantages, and to produce multiple textile filaments all of which are essentially uniform as to degree of crimp.

After much research in the fields of metallurgy and precision grinding, it has been discovered that the foregoing problems could not be solved in such fields. On the contrary, it has been discovered that strong thermally-induced stresses are involved and that excellent filament uniformity is achieved by controllably supplying external heat from outside the rolls, which heat provides thermal stress relief on these rolls and compensates for the lack of tangency, producing a pair of straight, parallel stress-relieved rolls having uniform line contact with essentially equal pressure from end to end, even while many cold filaments are being run continuously between the rolls. This discovery is of great importance because the production of truly uniform filaments, particularly yarns or tows, is thereby made possible.

Turning now to the drawings, which show specific forms of the invention but do not limit the scope of the invention as defined in the appended claims:

FIG. 1 is a view in side elevation, partly in section, showing one form of crimping apparatus constructed in accordance with this invention for crimping multiple ends of yarn;

FIG. 2 is a sectional view taken as indicated by the lines and arrows II—II which appear in FIG. 1, with certain parts further broken away and shown in section in order more clearly to reveal important details;

FIGS. 3, 4 and 5 are schematic views in exaggerated form, looking toward the nips of the crimping rolls, and illustrating respectively rolls which are convex, concave and tangent;

FIGS. 6, 7 and 8 are plan views of fragments of crimped yarn webs produced respectively by the rolls shown in FIGS. 3, 4 and 5;

FIG. 11 is a view in elevation, with the central portion broken away, showing various ends of yarn hanging on a crimp tester, illustrating a form of non-uniformity that is caused by relatively convex crimping rolls;

FIG. 12 is a view similar to FIG. 11, showing the non-uniformity caused by relatively concave crimping rolls;

FIG. 13 is a view similar to FIGS. 11 and 12, illustrating the crimping uniformity that is attained when the rolls are tangent;

FIG. 14 is a view similar to FIG. 1, illustrating a modified form of apparatus embodying principles according to this invention; and FIG. 15 is another view similar to FIGS. 1 and 14, showing still another modification.

Figure 9:
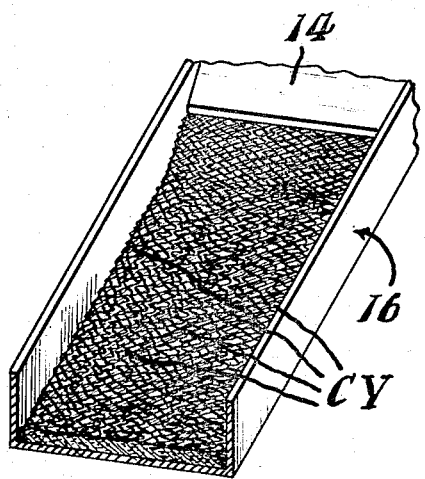
FIG. 9 is a view in perspective of a portion of a yarn collecting tray, showing the appearance of the crimped yarn as produced by a crimper having uniform, tangent rolls.

Turning now to one of the specific forms of the invention selected for illustration in the drawings, it will be appreciated that although specific forms of the inventio nhave been selected and will be described in specific terms for the sake of clarity, such terms are intended only to apply to the specific articles and structures shown in the drawings and are not intended to limit the scope of the invention as claimed. Although yarn in multiple ends has been selected as the filamentary material, the invention applies as well as to single end of yarn or to tows or fabrics, for example.

Referring particularly to FIGS. 1 and 2, the crimper there shown includes a pair of crimp rolls 10, 11 which are power driven and urged together to form a nip for the yarn Y which moves in the direction indicated by the arrow (a). Yarn Y is guided by a lease divider 12 which conforms to the shape of the rolls and separates the individual yarn ends one from the other. It will be appreciated that a large number of ends, for example one hundred or more, may be conducted separately through individual divider portions of the lease divider, as is now known in the art and disclosed in the aforementioned patent to Suggs, for example. Just downstream of the rolls 10, 11 is a stuffing chamber 13 having a door 14 and a pneumatically actuated cylinder 15 constructed to press the door against the mass of yarn contained within the chamber. The number 16 designates a tray located downstream of the chamber 13, preferably arranged generally horizontally, for carrying the crimped yarn CY away from the chamber.

As will be observed in FIG. 2, the roll 10 is urged downwardly against the roll 11 by means of compression springs 17, 17 which are effective at their upper ends upon the ears 20 of a crossplate 21 spaced above the top of the upper roll 10. At their lower ends, the compression springs 17, 17 bear upon sleeves 22 connected to bearings 23 on the drive shaft 24 of upper roll 10.

Coupled to the drive shafts 24 by universal couplings UC are pipes 24(a) and 74 which carry a heating fluid such as hot oil or the like, for heating the rolls in a manner further to be described.

As is shown in FIG. 2, each roll 10, 11 is hollow, having a fluted inner core 25 forming void spaces 26 inside an outer shell 27, for flow of hot oil or other heating liquid. Also, each cylinder is provided with inlet and outlet passages 30 and connecting passages 31 for circulation of hot liquid through and around the inner spaces 26. Thus, means are provided for internally heating the cylinders 10, 11 and particularly their outer shells 27 from within.

The pipes 24(a) are connected to a liquid heater and a circulating pump which of themselves are conventional and are not shown; their use in a crimper is disclosed in my co-pending patent application Serial No. 154,577, now abandoned.

As is shown in FIGS. 1 and 2, externally arranged heaters 40, 41 are located adjacent to the outer surfaces of the crimp rolls to supply external heat to the surfaces of the shells 27, from outside. As shown, each heater 40, 41 is arcuate in shape, is hollow and includes electric heating elements 42. Obviously, various other shapes and forms of heaters may be substituted.

As shown in FIGS. 1 and 2 of the drawings, each heater 40, 41 is mounted on a shaft 63(c), 64(c) which in turn is connected to a piston 63(d), 64(d) of a cylinder 63(b), 64(b) mounted on the crossplates 21, 21(a). Electric means, shown by supply lines $L_1$ and $L_2$, the latter connected to "ground," are provided for heating the upper and lower heaters 40, 41 respectively by way of conductors 50, 51 and 52.

In the form of the apparatus shown in FIGS. 1 and 2, the rate of addition of heat by way of the heaters 40, 41 is controlled in response to the speed of movement of the yarns through the rolls, which in turn is proportional to the speed of rotation of the rolls 10, 11 themselves. This is accomplished by means of a tachometer 53 geared to the main drive shaft of roll 11, having an indicator 54 connected by driving means 54(a) to a resistor 55 which is connected into the heater supply circuit. Thus, as the speed of the lower roll 11 changes, the setting of the rheostat or resistance of resistor 55 also changes, thus changing the electric current flowing to the heaters and therefore the heat supplied externally to the rollers 10, 11, all in proportion to the rate of speed of movement of the yarn itself. It will be observed that the tachometer 53 has a speed-responsive shaft 54(b) which is connected to a cam 56 which is set, at a predetermined crawl speed just above zero speed, to release a switch 57 thus opening the entire heating circuit and cutting off the heaters 40, 41 completely whenever the speed of revolution of the crimp rolls approaches zero. This protects against uneven heating or crimping when an end of yarn breaks or when the crimping machine must be shut down for any other reason.

The number 60 designates an on-off switch for the entire apparatus which is connected to operate the motor (not shown) which drives the main drive 61 of the crimper. Solenods 63, 64 are connected to operate normally open pneumatic valves 63(a), 64(a) which are connected to cylinders 63(b), 64(b) having shafts 63(c), 64(c) connected respectively to the heaters 40, 41. These cylinders 63(b), 64(b) have spring return pistons 63(d), 64(d) connected to draw the heaters away from the associated rolls, against the crossplates 21 and 21(a) which serve as stops.

The operation of the apparatus shown in FIGS. 1 and 2 will accordingly be apparently. When a plurality of ends of yarn are inserted through the lease reed 12 and into the nip between the rolls, and when the apparatus is energized and the main drive 61 is started, the crimper rolls revolve thus forcing the yarn into the stuffing chamber 13 causing the yarn to buckle and fold and therefore to form a multiplicity of V-shaped crimps. Similarly, the extrenal heaters 40, 41 are automatically energized by the closing of the on-off switch 60, and the rate at which heat is supplied is governed by the tachometer 53 in a manner proportional to the rate of rotation of the crimping rollers 10, 11. Thus, the tendency of the rolls to warp because of thermally induced stresses is eliminated by the thermal stress relief obtained by the action of the external heaters 40, 41 thereby preserving substantially uniform and complete tangency at the nip between the rolls from one end of the nip to the other.

If for any reason the yarn speed should increase, the heating rate is correspondingly increased to compensate for the additional heat transferred to and carried away to the stuffer chamber by the yarns, thus maintaining a substantially steady thermal relief effect and maintaining the rolls in a tangent condition from edge to edge, at the nip. Similarly, in the event that the speed of the rolls should decrease, a corresponding decrease is automatically made in the heat supplied externally. In the event that an end should break or that, for any other reason, the operator determines to turn off the on-off switch 60, then the electric current to the heaters is broken and the solenoid springs automatically retract the heaters to the maximum distance away from their corresponding rolls.

It will be appreciated that the internal heating of the rolls by means of circulating hot fluids such as oil or the like may be maintained substantially constant. It may also be controlled in direct relationship to the control of the heat supplied to the external heaters. Thus, the heater for heating the oil itself may be connected directly into the rheostat 55 for that purpose. However the controls are arranged, it is important to maintain a definite, controlled relation between the tempertaures at the outside and the inside of the cylinder shell.

It will be appreciated, accordingly, that where all other factors which tend to cause non-tangency of rolls are maintained constant, then the tendency toward non-tangency can be compensated for directly in proportion to the rate of speed of the yarn. Such other factors include but are not limited to total denier introduced, ambient temperature, humidity, finish applied to the surface of the yarn, and the type of yarn used, i.e. nylon or polypropylene, for example.

Turning now to FIGS. 3–8 of the drawings, the effects experienced due to faulty temperature balance are seen. It will be appreciated that under some thermal conditions the pair of rolls 10, 11 may become convex with respect to one another as shown in FIG. 3. This produces an effect where the crimps of the edgemost yarns $Y_1$ in FIG.

6 consist of large V-shaped crimps while the crimps of portions $Y_2$, $Y_2$ near the center of the rolls are much tighter. The opposite occurs in FIGS. 4 and 7, where the thermal conditions are such that the rolls are concave with respect to one another, producing a large, open crimp at the yarns $Y_3$, $Y_3$ in the center and tight crimps in the yarns $Y_4$, $Y_4$ at the edges. FIGS. 5 and 8 show the effect of the external heaters provided in accordance with this invention, wherein the thermal stress-relieving produces a straight-line nip; the rolls are substantially tangent to one another at any cross-section taken in any plane along the nip. FIG. 8 shows the uniformity of the yarn Y that is thus achieved.

Figure 10:
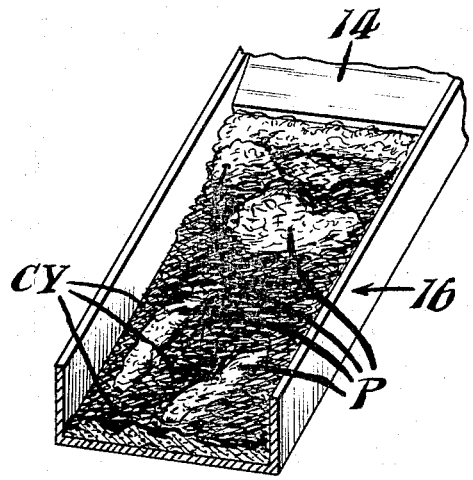
FIG. 10 is a view similar to FIG. 9, showing the appearance of the yarn when the rolls are non-tangent or non-uniform.

The operator of the apparatus may readily control the amount of heat provided, by visual inspection of the yarn as it passes away from the crimper along the trough 16. As is shown in FIG. 9, when the correct amount of external heat has been provided by the heaters 40, 41, the individual ends of yarn Y as carried on the trough 16 are all of equal crimp and tend to lie smoothly and in a flat plane in the bottom of the trough 16. By way of contrast, as shown in FIG. 10, when certain portions of the yarn are crimped more than others, the loosely crimped portions tend to form into lumpy puffs P as shown in FIG. 10. The locations of these puffs and their sizes convey to the operator the fact that a defective nip exists and indicates whether the defect is of the concave or convex type, thus enabling the operator to determine whether to increase or decrease the heat externally supplied.

Referring to FIGS. 11, 12 and 13 of the drawings, these show the results of standarized yarn crimp tests and illustrate the effectiveness of this invention as applied to actual yarns. In accordance with such standard yarn crimp tests, each end of yarn is separated and its separate identity is maintained. Thirty yards of yarn (thirty loops of one yard each, for example) from each portion was wound on a creel to obtain uniform skeins. These skeins of yarn were then hung on pegs with a uniform predetermined weight on each skein. The same procedure was followed with each of the (ninety-three) ends of yarn concurrently crimped in the same chamber, and all such yarns were hung side by side as shown. FIG. 11 shows the results of convex crimp rollers such as those in FIG. 3, wherein the centermost yarns have a much tighter crimp and therefore provide much shorter weighted loops in accordance with the crimp test. The outermost yarns are seen to have a much looser crimp. Similarly, FIG. 12 shows the product obtained when the crimp rolls are concave as shown in FIGS. 4 and 7, while FIG. 13 corresponds to FIGS. 5 and 8 and shows the uniformity that can be and is obtained in accordance with this invention.

Referring again to FIGS. 1 and 2, it will be observed that the rolls 10, 11 though provided with flow channels for the hot oil, are nevertheless relatively massive. This fact, together with the fairly substantial volume of hot oil or other heating medium passing therethrough means that the heat storage capacity for the rolls as a whole is quite large. This is emphasized for the reason that the internal temperature of the rolls may be considered to be relatively constant by reason of the large mass of material of the rolls and the absence of any changing rate of transfer of heat to cause any material change in the interior temperatures of the rolls 10 and 11. The situation is quite different, however, in respect to the exterior surface portions of the rolls since, as already explained, the passage of the yarns through the nip and their delivery to the chamber 13 represents a continuous flow of heat away from the rolls in the region of the nip. The rolls are maintained at elevated temperature which may run as high as 300° F. or more and the purpose of the high temperature, selected for the particular synthetic material used for the yarns, is for the purpose of producing not only the crimping, but also a flattening and reshaping of the yarn which frequently is supplied in circular cross-section. Added to the foregoing transfer of heat is the fact that the yarns may be at room temperature and thus represent a relatively cool stream of yarns passing through the crimping rolls and this further increases the removal of heat from the outer surface portion of the rolls 10 and 11. As indicated above, this differential of temperature as between the surface portions of the rolls and the internal portions thereof, gives rise to thermally produced mechanical stresses which can cause the rolls to take on the barrel shape of FIG. 3 or the concave contour of FIG. 4. However, since the interior temperature remains constant and the cooling effect on the exterior of the rolls varies with the speed of the rolls, for a given loading, it will be seen that by controlling the heaters 40 and 41 in accordance with the speed of the rolls, there will be automatically compensated the loss of heat and thus the exterior temperature of the rolls will be maintained at a close approximation to the interior temperature thereof.

Figure 14:
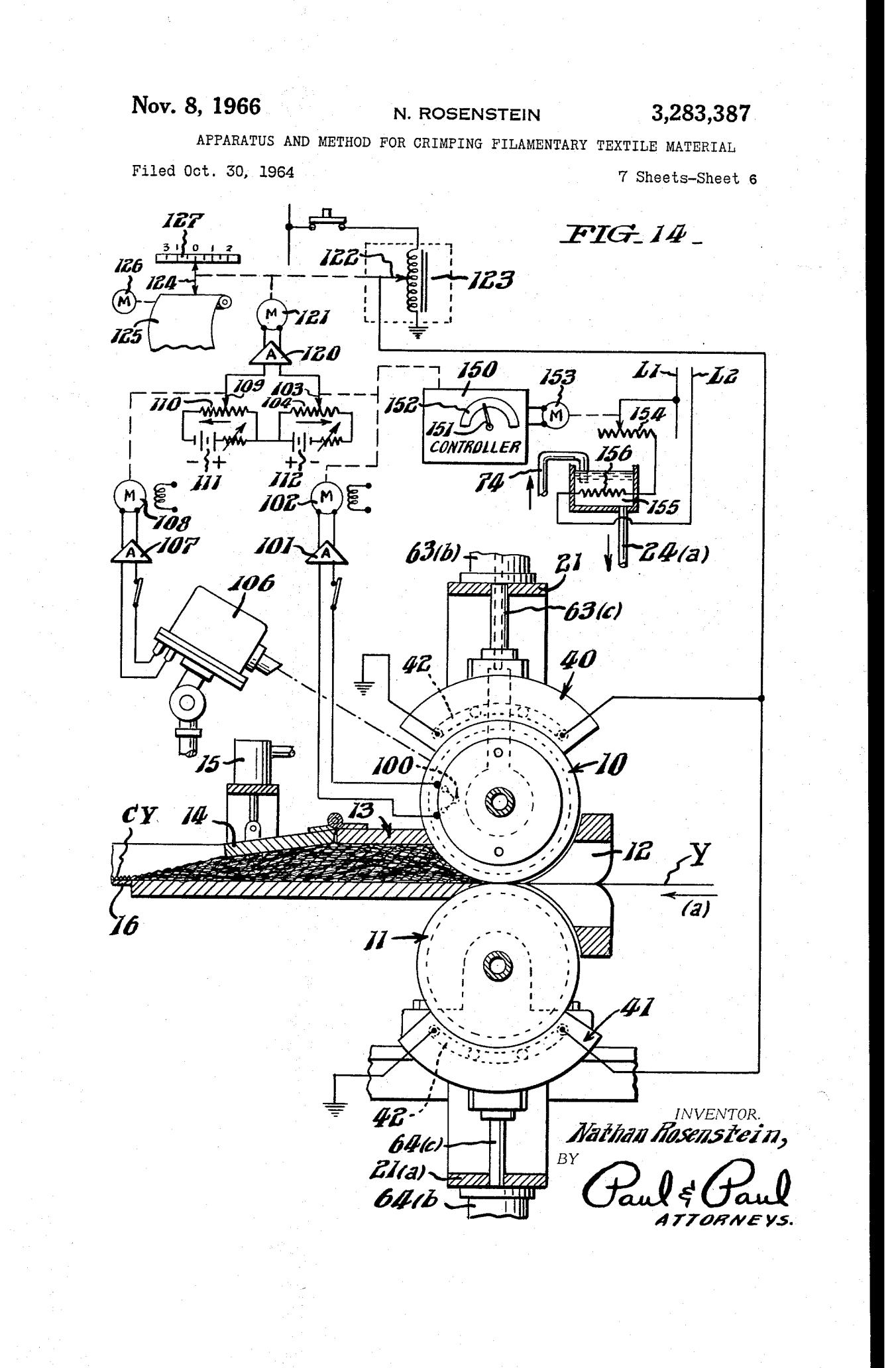

Referring now to FIG. 14, it will be seen that the principles just set forth have been utilized in connection with the rolls 10 and 11, which are of the same construction as more fully illustrated and described in connection with FIGS. 1 and 2. That is to say that they are provided with channels for internal heating, though indeed electrical heaters could be used for this purpose in lieu of the hot oil or other heating medium. In any event, there is provided a temperature measuring means shown as a thermocouple 100 disposed for the measurement of the internal temperature of the roll 10. This temperature responsive means may be inserted in the oil discharged from roll 10 or it may be disposed in a suitable cavity provided in the roll and which terminates near the inner wall of the outer shell of the roll. The thermocouple 100 is connected to an amplifier 101 arranged to energize a motor 102 to position a contact 103 of a potentiometer 104 as the temperature of the interior of the roll changes. The amplifier 101 and the motor 102 form parts of a temperature measuring system, such for example as utilized in modern electronic measuring recorders, an example of which may be found in William's Patent 2,113,- 164 and of which there are many now available on the market for producing rotation of the shaft in response to change in temperature.

In order to measure the exterior temperature of the roll 10, there is provided an optical pyrometer 106 which may be of the thermopile type sighted on the exterior surface and having an output applied to an amplifier 107 for energization of a motor 108 to position the contact 109 of a second potentiometer circuit 110. It will be observed that the batteries 111 and 112 of the potentiometer circuits are oppositely poled so that the voltage appearing between the contacts 103 and 104 will be proportional to the difference between the interior and exterior temperatures of the rolls 10 and 11. Thus, there will be an input to an amplifier 120 only in the event that the temperature of the exterior surface of the roll 10 differs from, for example is less than, the temperature of the interior portion of the roll. When that occurs, the amplifier 120 energizes a motor 121 which adjusts the contact 122 of the autotransformer 123 to increase the energization of the heaters 40 and 41. As the temperature difference is reduced to zero the motor 121 restores the contact 122 to its original position. If desired, the motor 121 may also position a pen-index 124 to record on a chart 125 driven by motor 126 the difference between the interior and exterior temperatures and which difference may likewise be read from a scale 127 shown as having a zero center.

It is to be understood that the system of FIG. 14 is shown in elementary form and is intended only to be illustrative of more sophisticated systems which may be used in order closely to regulate the exterior temperature to maintain it equal to the interior temperature. Obviously, instead of relying solely upon change in energization of the exterior heaters, one can utilize the output of motor 121 to increase the rate of circulation of the heating medium through the heaters, or to add heat to that medium to provide a greater outward flow of heat to the exterior surface. In general, however, it is preferred to utilize the direct control of the external heating surface by the control of the energization of the heaters 40 and 41.

For even greater precision of control the shaft-output of motor 102 may be applied to a controller 150 which includes a knob 151 for setting a pointer to the desired temperature on scale 152 which set-temperature is to be maintained constant within the rolls 10 and 11. When there is variation from the set-temperature, a motor 153 is energized to adjust a rheostat 154 to change the heating current from lines $L_1$ and $L_2$ for the heater 156 provided for the hot oil bath 155 circulated through rolls 10 and 11 by way of pipes 24($a$) and 74. The adjustment of rheostat 154 is to be taken as a symbolic representation of any suitable adjustment of the heat input means for the heating medium and also for the control of the rate of flow of the hot heating medium.

By thus fixing at a selected temperature, the interior of rolls 10 and 11, the outer surface portions will be closely maintained at that temperature to insure continued line tangency througout the length of the nip.

Further in connection with the phrase "line tangency throughout the length of the nip," it is to be understood that this phrase is defined as the condition which would obtain if the rollers are adjusted until the roller 10 is just in contact with the roller 11. Since at least the operative portions of the rollers are cylindrical and in geometrical terms may be considered to be surfaces of revolution with the generatrix of the surface a straight line, it will be understood that when the cylinders 10 and 11 just touch each other, there is a line contact common to both of the cylinders. When the cylinders are slightly separated at the nip for the crimping of the yarns, it will be understood that these lines, one in each cylinder, are to remain parallel one to the other and are to continue to be straight lines instead of curvilinear lines as earlier indicated showing the deviation to convex or the concave form, depending upon the direction of the thermally induced mechanical stresses which cause the difficulty and result in variations in the crimping to the detriment of the final product.

In certain types of crimping, solid rolls are provided instead of the hollow-type illustrated in FIGS. 1, 2 and 14. Such a crimping system has been illustrated in FIG. 15 where the rolls 130 and 131 are shown as solid in cross-section mounted on their respective shafts, the other parts being the same as illustrated in FIGS. 1 and 2. Where the rolls are solid, the effect of the work done in crimping the yarn and transferring the yarn through the rolls gives rise to a heating effect rather than a cooling effect. Accordingly, the difference in temperature between the interior and exterior arises by reason of a temperature rise of the exterior surfaces of the rolls. In order that these rolls can be maintained at room temperature or thereabout, it becomes necessary to cool the exterior surfaces. Though this may be done in accordance with the tachometer arrangement of FIG. 2, i.e. to vary the cooling in proportion to the speed, and hence with the load and the amount of work done which causes the temperature rise, the needed cooling may also be accomplished by providing internal and external thermocouples 132 and 133 which, it will be observed, are connected in series opposition in the input circuit to an amplifier 134. Thus the amplifier 134 will respond only to a difference in temperature. By reason of a diode 135 in the output circuit, it will only energize a relay 136 when the exterior temperature increases above that of the interior temperature of the rolls. When this occurs, the relay 136 is energized to close its contacts and hence to complete a circuit for a motor 137 driving a compressor 138 which forces streams of air through the distributing heads 139 and 140 to produce a cooling effect on the exterior surfaces of the rolls. It will be understood, of course, that these distributing heads 139 and 140 extend the full length of the rolls, thus to provide the needed uniform cooling lengthwise thereof and to assure the maintenance of the lengthwise tangency at the nip. It is to be noted that the external thermocouple 133 is mounted within an enclosure in close juxtaposition with the roll 10. A resistance thermometer may be substituted for thermocouple 133 and the arrangement as a whole may be similar to that shown in U.S. Patent 2,627,182. Though not as desirable, nevertheless heaters may be inserted into openings in the rolls 130 and 131 and the relay 136 used to break and make the heater circuits to equalize the internal and external temperatures to avoid the thermally-induced roll-deforming mechanical stresses.

It will be appreciated that, although FIG. 14 shows an optical pyrometer 106 arranged for sensing the surface temperature of the roll 10, whereas FIG. 15 shows a contact thermocouple 133 for the same purpose, various other means may be utilized for sensing this and other temperatures in accordance with this invention. Actually, where shiny surfaces are involved, as is often the case with textile crimping rolls, the shininess of the surface sometimes causes a slight error in the operation of many optical pyrometers, therefore in many cases it may be preferable to employ the contact thermocouple such as that appearing in FIG. 15, to the optical pyrometer appearing in FIG. 14.

It is to be understood that further modifications may be made in practicing the method and in the apparatus embodying the present invention, that equivalent elements may be substituted, that parts may be reversed and that certain features discussed in connection with one embodiment may likewise be used with other embodiments, though not explicitly set forth in the above description, which is to be taken as exemplary of the preferred forms of the invention and which are intended to be covered by the appended claims.

The following is claimed:

1. In a method of crimping a filamentary textile material, wherein a plurality of textile filaments is passed into the nip formed between a pair of cooperating crimping rolls and forced thereby into a compression chamber, and wherein the passage of said filaments through said nip causes a divergence from linearity of said rolls at said nip, the method of correcting such divergence which comprises transferring heat internally of at least one of said rolls and also transferring heat externally of the surface of at least one of said rolls, and controlling said transfer of heat to control said divergence from linearity.

2. In a method of crimping yarns, wherein a plurality of yarns is passed in substantially parallel relationship into the nip formed between a pair of cooperating crimping rolls and forced thereby into a compression chamber, the method which comprises internally heating at least one of said rolls and also externally heating at least one of said rolls and controlling the rate of addition of such external heat.

3. In a method of crimping a filamentary textile material, wherein a plurality of textile filaments is passed into the nip formed between a pair of cooperating crimping rolls and forced thereby into a compression chamber, the method which comprises both internally and externally heating at least one of said rolls and controlling the rate of addition of such external heat and varying the rate of addition of such external heat in accordance with variations of rate of heat transfer from said roll to said filaments.

4. In a method of crimping a filamentary textile material, wherein a plurality of filaments is passed into the nip formed between a pair of cooperating crimping rolls and forced thereby into a compression chamber, the method which comprises sensing the temperature on the external surface of one of said rolls, sensing another temperature at a selected internal point spaced internally of said rolls from said surface, and changing the temperature of said external surface to a value substantially equal to the temperature of said internal point.

5. The method of eliminating thermally induced roll-deforming stresses developed by cooperating crimping rolls as filaments are fed through them with resultant flow of heat between the surface of the rolls and the material being crimped, which comprises producing at a location spaced from the crimping zone of said rolls a flow of heat in a direction opposite to that which occurs in said crimp-forming zone.

6. In a method of crimping a filamentary textile material, wherein a plurality of filaments is passed in substantially parallel relationship into the nip formed between a pair of cooperating crimping rolls the surfaces of which, at the nip, are tangent one to the other lengthwise of the rolls, the said rolls forcing the filaments into a compression chamber, the method of preventing thermally induced mechanical forces from distorting said rolls by reason of a difference between the internal and external temperatures thereof which comprises supplying heat to said rolls internally thereof, supplying heat to said rolls externally thereof, and varying at least one of said rates of heat supply to maintain at equality said external and internal temperatures of said rolls.

7. In an apparatus for crimping textile filaments, including a pair of rolls forming a nip arranged to force a plurality of filaments into a compression space, and wherein such nip tends toward non-linearity, means for correcting said tendency, which means comprises external heat transfer means arranged in heat transfer relation to at least one of said rolls, and control means for controlling such heat transfer means to combat said tendency toward non-linearity.

8. The apparatus defined in claim 7, wherein such heat transfer means is a heater.

9. The apparatus defined in claim 7, wherein such heat transfer means is a cooler.

10. The apparatus defined in claim 7, wherein said control means is an automatic means responsive to difference of external and internal temperature in said roll, and connected to said heat transfer means to adjust to a minimum the difference between said external and internal temperatures.

11. The apparatus defined in claim 7 wherein said control means is connected for varying the rate of transfer of external heat to said rolls.

12. The apparatus defined in claim 7 wherein said control means is responsive to the rate of transfer of heat from said filaments, for varying the rate of transfer of heat from said external heater to said rolls.

13. The apparatus defined in claim 12, wherein such control means is responsive to changes of filament speed.

14. The apparatus defined in claim 11, wherein the filaments emanating from said chamber are passed along as a web and are continuously accumulated and continuously withdrawn from such accumulation, and wherein such control means is responsive to the size of such accumulation at a particular location across the width of said web.

15. An apparatus for cramping textile filaments, including a pair of rolls forming a nip characterized by the tangency of said rolls throughout their length and arranged to force a plurality of filaments into a compression space, variations between the internal and external temperatures of said rolls developing forces tending to cause said rolls to depart from said tangential relationship, characterized by the provision of means for correcting said tendency comprising heat transfer means arranged in heat transfer relation to at least one of said rolls for equalizing said internal and external temperatures.

16. The apparatus of claim 15 in which temperature responsive means are provided for the interior and exterior portions of at least one of said rolls, and means responsive to the difference between said temperatures for controlling said heat transfer means to bring said temperatures into equality.

References Cited by the Examiner
UNITED STATES PATENTS

| | | | |
|---|---|---|---|
| 2,914,810 | 12/1959 | Robinson et al. | 19—66 |
| 3,111,740 | 11/1963 | Stanley | 28—1 |
| 3,174,208 | 3/1965 | Saito et al. | 28—1 |

MERVIN STEIN, *Primary Examiner.*

L. K. RIMRODT, *Assistant Examiner.*